J. D. IHLDER.
ALTERNATING CURRENT MOTOR CONTROL.
APPLICATION FILED JAN. 15, 1907.
982,067.
Patented Jan. 17, 1911.
3 SHEETS—SHEET 1.
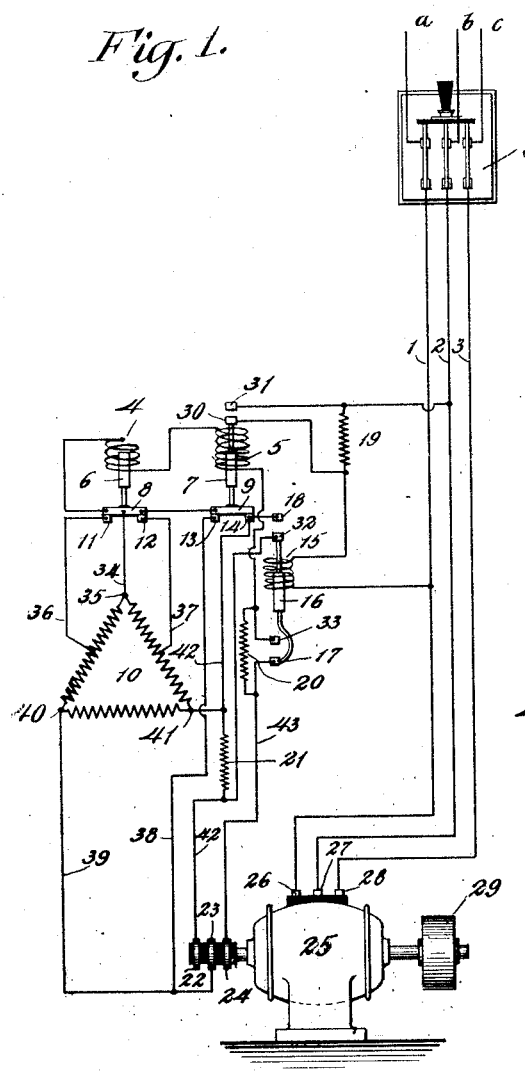
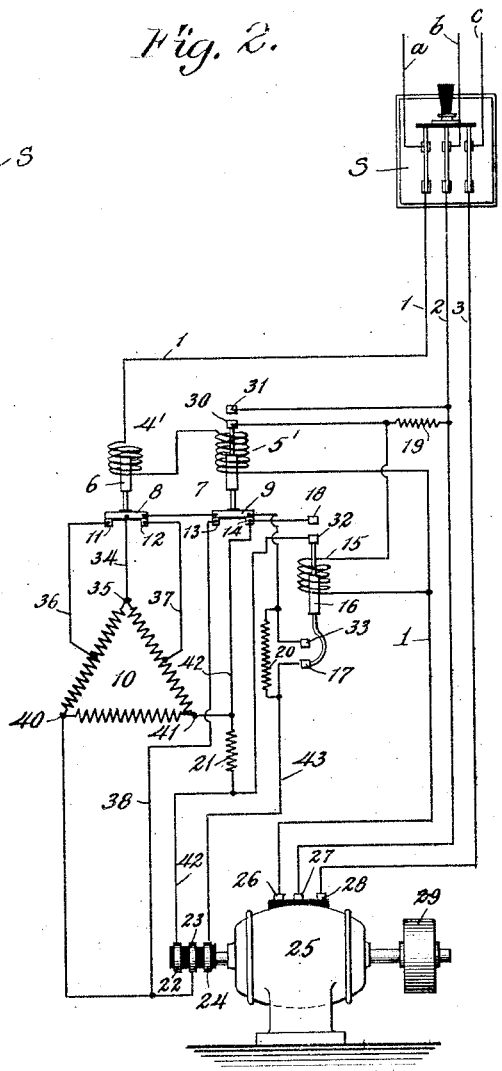
WITNESSES:
INVENTOR
John D. Ihlder
BY
C. M. Nissen
ATTORNEY J. D. IHLDER.
ALTERNATING CURRENT MOTOR CONTROL.
APPLICATION FILED JAN. 15, 1907.
982,067.
Patented Jan. 17, 1911.
3 SHEETS—SHEET 2.
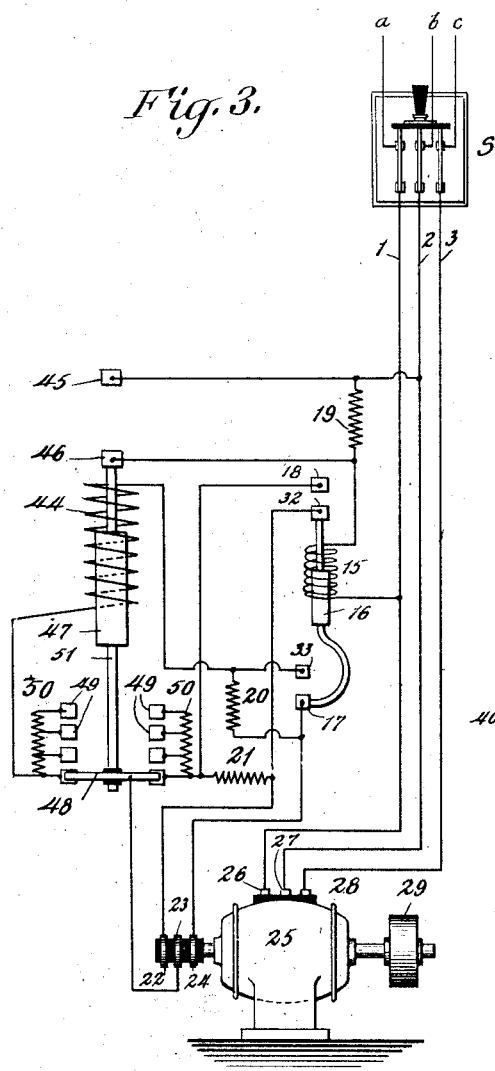
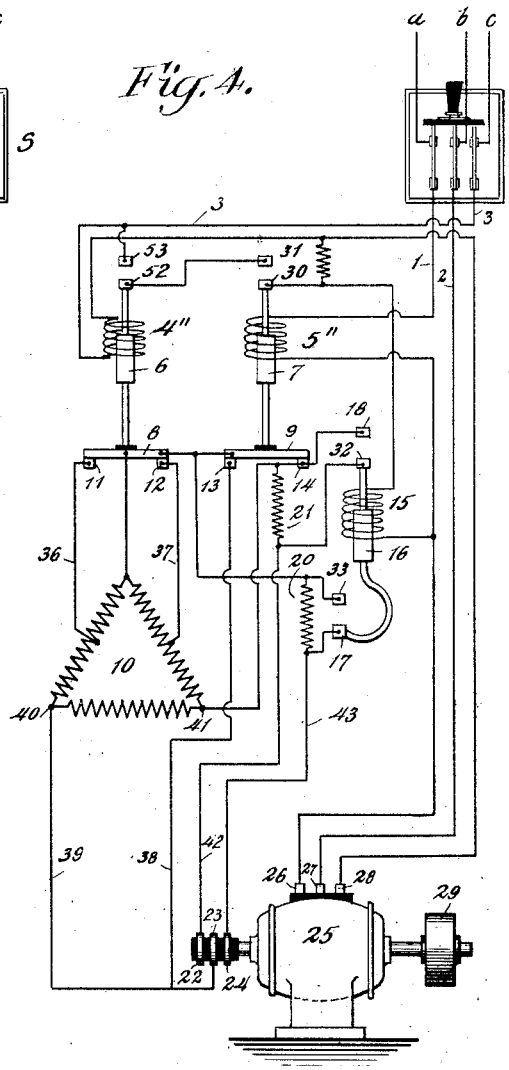
WITNESSES:
James G. Bethell
Walter C. Strang
INVENTOR
John D. Ihlder
BY
C. M. Nissen
ATTORNEY

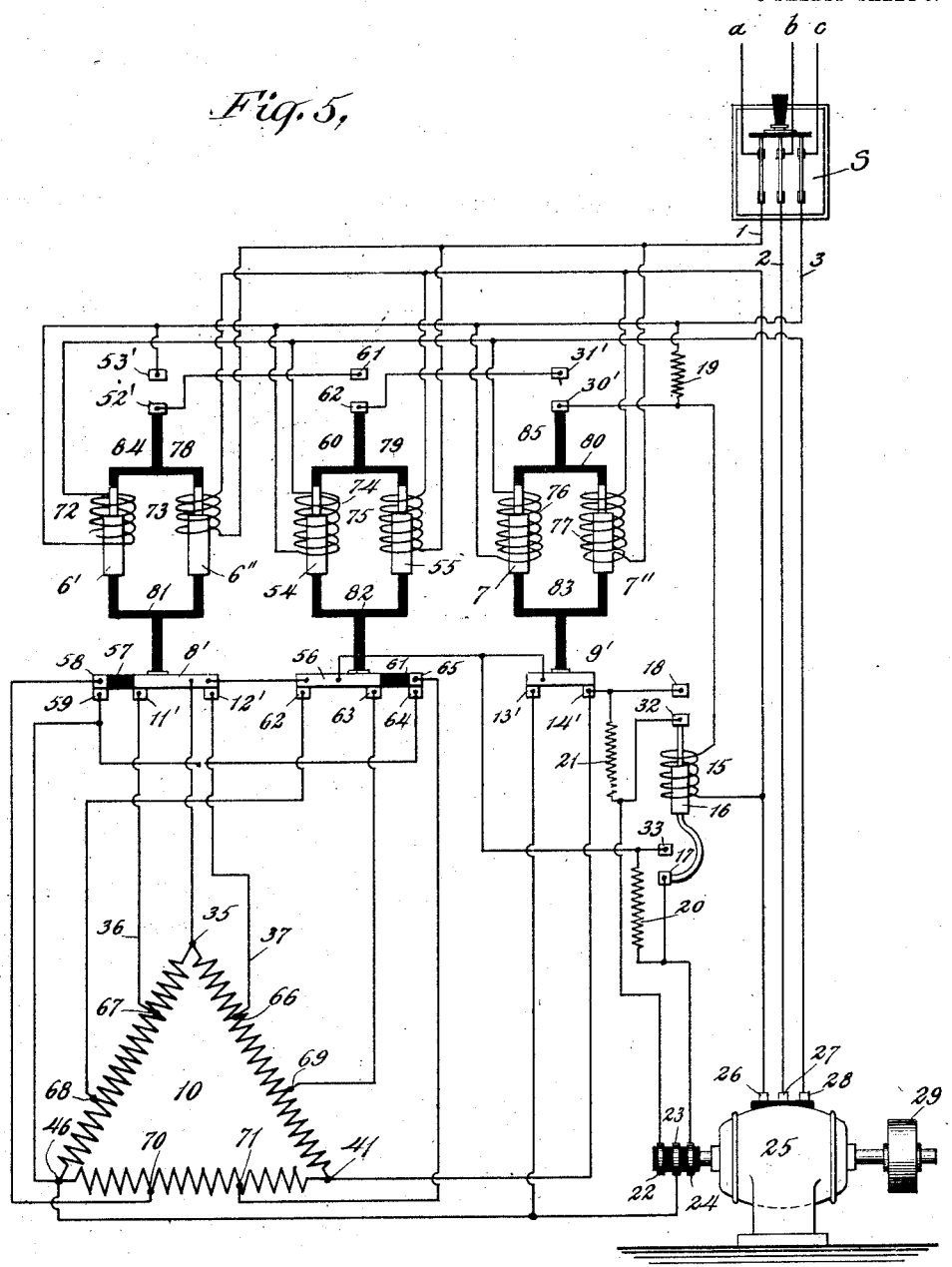

UNITED STATES PATENT OFFICE.

JOHN D. IHLDER, OF NEW YORK, N. Y., ASSIGNOR TO OTIS ELEVATOR COMPANY, OF JERSEY CITY, NEW JERSEY, A CORPORATION OF NEW JERSEY.

ALTERNATING-CURRENT-MOTOR CONTROL.

982,067.

Specification of Letters Patent.

Patented Jan. 17, 1911.

Application filed January 15, 1907. Serial No. 352,382.

*To all whom it may concern:*

Be it known that I, JOHN D. IHLDER, a citizen of the United States, residing in New York city, in the county of New York and State of New York, have invented a new and useful Improvement in Alternating-Current-Motor Control, of which the following is a specification.

My invention relates to alternating current motor controlling apparatus, and one of its objects is to provide means for automatically cutting out or short-circuiting the starting resistance which depends for its operation upon the varying current strength of the motor circuits.

Another object of my invention is to provide means for accelerating an alternating current motor from a state of rest to full normal speed, which shall be automatic in its operation and dependent upon the load on the motor.

A further object of my invention is to provide automatic means for starting an alternating current motor which will not operate to short-circuit the starting resistance should the motor for any cause become stalled or overloaded.

Other objects of my invention will be brought out more fully hereinafter, and the novel combinations of elements finally pointed out in the claims.

My invention relates to a construction and arrangement in which one or more magnets in the rotor or stator circuit of an alternating current motor are arranged to control a series of switches which, when closed, short-circuit the starting resistance, and they are so designed that the rush of current upon starting the motor is sufficient to cause them to open their contacts, thereby inserting the starting resistance in the motor circuit. As the motor picks up speed, the current therein gradually decreases and the magnets are sufficiently deënergized to enable them to close their contacts, thereby short-circuiting the starting resistance in successive steps. In some cases I provide auxiliary resistances to keep the initial rush of starting current within bounds. These auxiliary resistances are short-circuited as soon as the starting resistance has been inserted in the motor circuit.

The accompanying drawings illustrate diagrammatically various ways in which I accomplish the objects of my invention enumerated above.

Figure 1 illustrates a wiring diagram in which the starting resistance controlling magnets are connected in series with the rotor circuit of the motor. Fig. 2 is a similar diagram except that the magnets which control the starting resistance are in series with the stator windings of the motor. Fig. 3 is a modification of Figs. 1 and 2, the essential difference being that the starting resistance in this case is controlled by a single magnet of the solenoid type which operates a sliding contact device. Fig. 4 is a further modification of Figs. 1 and 2. In this case two magnets are used to control the starting resistance, each magnet being connected in different phases of the stator circuit. Fig. 5 is a further modification employing double coil magnets for controlling the starting resistance, the coils of each magnet being connected in different phases of the stator circuit.

For the sake of clearness and easy comprehension, the various magnets are illustrated as single-phase magnets of the solenoid type, but I wish it to be clearly understood that the various magnets employed may be of any construction or type suitable to the duty which they are to perform. For instance, it is perfectly feasible to use but one magnet of single or multiple phase windings operating a number of contacts consecutively for cutting out the starting resistance, or, if desired, a series of single or multiphase magnets each having one or more contacts. Also any desirable number of magnets and contacts may be used, depending upon the number of steps into which the starting resistance is sub-divided.

The various magnets used to carry out my invention and as illustrated in the drawings, are of a type which close their contacts by the action of gravity. If desired, a spring or any equivalent device may be used to close these contacts, and a dash-pot or magnetic retarding means could be added if desired.

Similar reference characters are used throughout the various figures for similar parts, in which—

$a$, $b$ and $c$ designate a source of alternating current supply and S is a main line switch.

1, 2 and 3 designate main line wires leading to the controlling apparatus and the motor.

Referring more particularly to Fig. 1, 4 and 5 designate magnets having cores 6 and 7 to which are connected contact devices 8 and 9, respectively. The contact-piece 8 connects or bridges the fixed contacts 11 and 12, while the contact-piece 9 bridges the fixed contacts 13 and 14 when in the position shown. To an extension of the magnet core 7 is fastened a contact 30 above which is a similar fixed contact 31 adapted to be engaged thereby when the contact 30 is raised by the core 7. 10 designates the motor starting resistance and 15 designates a magnet having a core 16 to which is connected the contacts 32 and 17. When the core 16 is in its lowermost position these contacts 32 and 33 are in the position shown, but, as soon as the core 16 is lifted, the contact 32 engages a fixed contact 18 and the contact 17 engages a fixed contact 33. 19, 20 and 21 designate auxiliary resistance. 25 is an alternating current motor, three collector rings 22, 23 and 24 being shown on the rotor shaft, while 29 is a pulley or other power-transmitting device. 26, 27 and 28 designate the stator terminals. The contact-piece 8 of the magnet switch 4 is connected by the wire 34 to the point 35 on the starting resistance 10. Similarly the wires 36 and 37 connect intermediate points of the resistance 10 with the contacts 11 and 12, respectively. In like manner, the wires 38 and 39 and the wire 42 connect the points 40 and 41 with the contacts 13 and 14, respectively. The point 40 of the resistance 10 is connected directly to the collector ring 23, the point 41 is connected through the resistance 21 to the collector ring 22 and the point 35 is connected through the windings of magnet switches 4 and 5 through the resistance 20 to the collector ring 24. The main line wires 1, 2 and 3 lead directly to the stator terminals 26, 27 and 28. It will readily be seen by an inspection of the drawing that the contacts 33 and 17, when connected, short-circuit the resistance 20, and the contacts 18 and 32 short-circuit the resistance 21 when they are connected, by the magnet switch 15. The contacts 30 and 31, when connected, short-circuit the resistance 19.

The foregoing description applies equally well to Fig. 2. The only difference is that in Fig. 2 the magnet switches 4' and 5' have their windings connected in series with one phase of the stator winding of the motor through the main wire 1.

In Fig. 3 the starting resistance 50, 50 is inserted or cut out of the rotor circuit by the contact-piece 48 as it moves over the fixed contacts 49, 49. This contact-piece 48 is connected to the core 47 by the rod 51 so that as the core 47 is lifted or lowered in the solenoid winding 44, the contact-piece 48 is moved over the contacts 49, 49. A contact 46 is also carried by the core 47 and is adapted to engage a fixed contact 45 whenever the core 47 is lifted to its uppermost position. In other respects Fig. 3 is similar to Fig. 1.

Fig. 4 resembles Fig. 2 very closely, the essential difference being that while in Fig. 2 the starting resistance controlling magnet switches 4'' and 5'' are connected in series with one phase of the stator circuit, Fig. 4 shows each magnet switch connected in a separate phase of the stator circuit. Also, the magnet switch 4'' in Fig. 4 has an additional contact 52 carried by an extension on its magnet core, and coöperating with a fixed contact 53 placed directly above it.

As before stated, Fig. 5 comprises double coil magnets for controlling the starting resistance 10; each of the coils of any one magnet is connected in series with a different phase of the stator winding of the motor. The resistance controlling switches, of which three are shown, are designated by the numerals 84, 60 and 85. They are very similar in construction, the chief difference being in the contacts operated thereby and in the electrical connections which lead to these contacts. Each of these magnet switches comprises two solenoid cores, as 6' and 6'', controlled by the windings 72 and 73, respectively, and these cores are rigidly connected together at either end by Y-shaped insulation pieces 78 and 81. The upper insulation piece 78 carries a contact 52' adapted to engage a fixed contact 53' situated a short distance above it. The lower insulation piece 81 is connected to a contact-making device comprising the contact-piece 8' which engages two fixed contacts 11' and 12', and a contact 58 which is insulated from the contact-piece 8' by the insulation 57. This contact 58 engages a fixed contact 59 when in its closed position, as shown. The switch 85 has a single contact-piece 9' attached to the insulation 83 and it bridges two fixed contacts 13' and 14' when in its lowermost position, as shown on the drawing.

I have shown throughout the various views an alternating current motor of conventional type provided with a pulley 29 which may be used to transmit motion to any power-consuming device, but my invention is applicable to any power purpose whatsoever, and more particularly when it is desired to frequently start, stop or reverse the motor, as is required for the operation of hoisting devices, pumping machinery, etc.

In order to start an alternating current motor from rest, and to prevent a too sudden rush of current, which would seriously affect the power circuit and probably damage the motor, it has been found that the best results have been obtained by placing a resistance in series with the rotor circuit, this resistance being short-circuited as soon as the motor has reached a proper speed. Theoretically, this starting resistance should be under the control of the motor to which it is applied. For example, if we attempt to start a motor which is overloaded and the starting resistance does not allow sufficient current to pass in order to enable the motor to quickly reach normal full speed, the means for cutting out the starting resistance which is usually dependent on a time element operates to cut out the resistance and the motor gets current far in excess of what it should be until finally the main fuse blows or the motor is seriously damaged. Again, if the motor is very lightly loaded, it is desirable to accelerate it rapidly to full speed in order to prevent too great a loss in the starting resistance.

In starting devices in use at the present time, the above-enumerated undesirable features are always present and while such starting devices may be regulated to operate for any one particular load, they do not give satisfaction where the load varies to any appreciable extent. My invention entirely obviates this and other undesirable features.

I will now describe the operation of my device, referring to the various figures in turn: Assuming the parts in Fig. 1 as shown and the main line switch S closed, current will flow directly to the motor stator through the wires 1, 2 and 3. At the same time an induced current will be set up in the rotor, connections from which lead to the slip rings 22, 23 and 24. The magnet switch comprising the magnet 5 is at this time closed and the starting resistance 10 short-circuited thereby, since the terminal 40 is connected to the contact-piece 14 and the terminal 35 is connected to the contact-piece 8, and since these contacts are in electrical connection with each other through the contact-pieces 8 and 9. The auxiliary resistance 21, however, is in circuit between the slip rings 22 and 23; also the auxiliary resistance 20 is in series with the slip rings 23 and 24, the switches controlled by the magnet 15 being open at this time. As it is frequently desired to allow the motor when starting under load more current than is required when running at full speed, the auxiliary resistances 20 and 21 are so proportioned as to give the requisite amount, and the motor is enabled to start. The windings of the magnets 4 and 5 are in series with the resistance 20 and the slip rings 23 and 24; therefore, the initial starting current in the rotor passes through their windings and the magnetizing power produced therein is of sufficient strength to lift their cores and connected contacts, thereby inserting the starting resistance 10 in the rotor circuit. The motor has by this time overcome the frictional starting load and does not require so much starting current. When the magnet 5 separates the contacts 13 and 14 it also connects the contacts 30 and 31, thereby short-circuiting the resistance 19. It will be noticed that the winding of magnet 15 is in series with the resistance 19 across the main wires 1 and 2. It therefore receives single-phase current directly from the mains. The resistance 19, however, is of such amount as to limit the current in the winding of magnet switch 15, preventing it from lifting its core 16 and contacts connected therewith. As soon, however, as the magnet 5 has connected the contacts 30 and 31 the resistance 19 is short-circuited and the magnet 15 is of sufficient strength to lift its core and connect the contacts 18 and 32, and 17 and 33, respectively. The connecting of these contacts short-circuits the auxiliary starting resistances 20 and 21. The motor is now receiving normal starting current limited in amount by the resistance 10.

As the motor accelerates, the current in the motor diminishes, as does also the current in the magnets 4 and 5, they being in the same circuit. The strength of current in the windings of magnets 4 and 5 finally reaches a point at which it will no longer sustain the cores 6 and 7 in their uppermost positions, and the cores will be gradually released to descend by gravity. The magnet 4 is purposely made weaker than that of magnet 5, consequently it will permit its switch to be closed first, thereby cutting out a portion of the starting resistance 10. As soon as the magnet 5 permits its switch to close, all of the resistance is cut out of the rotor circuit and the motor runs at normal speed at full line potential. When the magnet 5 closes its lower switch, the contacts 30, 31 are again separated, thereby reinserting the resistance 19 in series with the winding of magnet 15; but while the diminished current now flowing is not sufficient to lift the core 16 and its connected contacts, it is of ample strength to maintain the core in its upper position. Therefore, the auxiliary resistances 20 and 21 remain short-circuited.

To stop the motor it is merely necessary to open the main line switch S, whereupon current is cut off from the motor and all the parts return to normal starting position. It will thus be seen that it is impossible to injure the motor by excessive starting current since the initial rush of current is kept within bounds by the auxiliary resistances 20 and 21, and these resistances cannot be short-circuited until the starting resistance has first been inserted, and the starting resistance itself cannot be cut out until the motor is in a proper condition to justify the removal of this starting resistance.

The foregoing is equally applicable to Fig. 2. The operation is practically the same, the only difference being that the windings of magnet switches 4' and 5' are in series with one phase of the stator circuit, and are subjected to the same rise and fall of current strength therein.

In Fig. 3 the operation of the parts and the results obtained are similar to those of Figs. 1 and 2. The motor starts with the auxiliary resistance 20 and 21 in the rotor circuit, the starting resistances 50, 50 being short-circuited. The initial starting current lifts the core 47, inserting the starting resistance, and by connecting the contacts 45 and 46, allows the magnet 15 to operate its switches and thereby cut out the auxiliary resistances 20 and 21, and as the motor speeds up and the rotor current decreases, the core 47 gradually lowers and cuts out step by step the starting resistance 50, 50.

The operation of Fig. 4 is similar to the foregoing except that in this instance a contact 52 coöperating with a fixed contact 53, is connected to the magnet 4"; thus it is manifestly impossible to operate the magnet 15 unless both the cores of the magnets 4" and 5" are in their uppermost positions, which insures that all of the starting resistance must be inserted in the rotor circuit before it is possible to operate the magnet 15, thereby short-circuiting the auxiliary starting resistances.

In Fig. 5 the magnet coils 72, 74 and 76 are in parallel with each other, and in series with the main wire 3 which is one phase conductor of the stator circuit; also the coils 73, 75 and 77 are in parallel series relation to the main 1 which is another phase conductor of the stator circuit. Upon closing the main line switch S, current flows from the power circuit a, b and c through the windings of the magnet switches 84, 60 and 85 to the stator of the motor, the induced rotor circuit being limited in strength by the auxiliary starting resistances 20 and 21; the starting resistance 10 is at this time short-circuited by the magnet switches 84, 60 and 85. Since the stator current upon starting is at a maximum, the magnet switches 84, 60 and 85 are sufficiently energized to lift their respective cores and connected mechanism, thereby inserting into the rotor circuit the entire starting resistance 10 which heretofore was short-circuited. The switches 84, 60 and 85 are now in their upper positions and their upper contacts 52'—53', 62—61, and 30'—31', respectively, are connected. These contacts, when connected, short-circuit the resistance 19 since they provide a path around it of practically zero resistance. The winding of the magnet switch being thereby subjected to the full line potential existing between the phases 1 and 3, sufficient magnetism is produced therein to operate this switch to connect its contacts, thereby cutting the auxiliary resistances 20 and 21 out of the rotor circuit. By this time the motor has picked up its load and receives current limited in amount by the starting resistance 10. At about this time the current flowing to the stator and the magnet switches 84, 60 and 85 has diminished to such an extent that the magnet switches are not able to longer maintain their cores and connecting mechanism in their raised position. The coils of magnet switch 84 being purposely made weaker than those of switches 60 and 85, the switch 84 will be the first to connect its lower contacts and separate the top contacts 52' and 53'. A circuit to the magnet 15 is thereby interrupted at these top contacts, but the winding of magnet 15 still receives current through the resistance 19, and this current is of sufficient strength to maintain the switch in a closed position. The magnet switch 84 having closed its lower contacts, that portion of the starting resistance 10 between the points 35—67, 35—66, and 46—70, is short-circuited. The current in the rotor is now increased and the speed rises, producing a still further drop in current strength in both the rotor and stator circuits. The motor speed increases until the magnet switch 60 is unable to longer maintain its core in its uppermost position and the same will drop, thereby connecting its lower contacts and separating the top contacts 62 and 61. The connection of the lower contacts causes additional sections of the starting resistance 10 to be short-circuited, namely, that part of the resistance 10 between the points 67—68, 66—69, and 70—71. The motor further increases its speed until finally the magnet switch 85 permits its contacts to be connected, thereby joining together the terminals 35, 46 and 41 of the starting resistance 10. This will of course short-circuit the entire starting resistance 10 and the motor quickly reaches full normal speed, there being no appreciable resistance in either the rotor or stator circuit of the motor. Opening the main line switch S operates to stop the motor and return all the parts to initial position.

While I have shown and described my device as controlling the insertion and cutting out of the starting resistance in three steps, there may be only one or two steps or more than three steps. The number of divisions or steps into which the starting resistance may be divided is entirely optional and depends upon the size of the motor used and the duty which it is to perform. By the use of additional magnet switches or contacts, or otherwise, both the starting resistance and auxiliary resistance may be divided into as many steps or sections as desired, the main object being to start and accelerate the motor promptly and smoothly.

It should be particularly noted that if the main line current should be unintentionally interrupted, or when interrupted by the opening of the switch S, too much current cannot be received by the motor when the current is again turned on. This is for the reason that, as soon as the current to the electromagnetic switch 15 is interrupted, the contacts 18 and 32 will become disengaged as well as the contacts 30 and 31. It is therefore necessary that the starting resistance be reinserted before the auxiliary resistances can be cut out to effect the acceleration of the motor initially.

My invention is adapted to an alternating current motor of either single or multiphase type, and while I have shown and described a system embodying my invention using auxiliary starting resistance, in some cases I prefer to omit them entirely, particularly where the motor to be controlled is of small size and does not require a heavy starting current to produce the necessary torque.

Obviously those skilled in the art may make various changes in the details and arrangement of parts of my invention without departing from the spirit and scope thereof, and I desire, therefore, not to be lmited to the precise construction herein disclosed.

Having thus fully described my invention, what I claim and desire to have protected by Letters Patent of the United States is:—

1. In motor-controlling apparatus, the combination with starting resistance, of auxiliary resistance, means for effecting a successive insertion of said starting resistance and the cutting out of the same, and a device for cutting out said auxiliary resistance upon the insertion of said starting resistance.

2. In motor-controlling apparatus, the combination with an alternating current motor of the induction type, of starting resistance connected to the secondary of the motor but initially cut out, auxiliary resistance initially in circuit with said secondary, means for inserting said starting resistance when the motor receives current, and appliances dependent upon said means to cut out said auxiliary resistance.

3. In a starter for electric motors, the combination with a motor, of a starting resistance normally cut out, an auxiliary resistance normally in circuit with a part of said motor, one or more members for varying said starting resistance, said members being normally out of the starting position, electromagnetic means for moving said members from running to starting position and to retard the movement of said members from starting to running position, and means controlled by said electromagnetic means for cutting out said auxiliary resistance when said members reach the starting position.

4. The combination with an alternating current motor, of starting resistance therefor, auxiliary starting resistance, means for inserting said first-named resistance in circuit with the rotor of the motor, and apparatus co-acting with said inserting means for cutting out said auxiliary resistance, said inserting means effecting the gradual cutting out of said first-named starting resistance as the motor increases in speed.

5. In motor-controlling apparatus, the combination with an alternating current motor and a starting resistance connected to the rotor thereof, of one or more resistance-varying members normally cutting out said resistance, auxiliary resistance normally in circuit with the rotor, electromagnetic means for moving said members from normal position to starting position, and retarding the movements of said members from starting to running position, and appliances for cutting out said auxiliary resistance after the starting resistance is inserted.

6. In motor-controlling apparatus, the combination with an alternating current motor, of a starting resistance therefor, a resistance-varying member or members normally short-circuiting said starting resistance, auxiliary starting resistance, electromagnetic means for moving said members from normal position to starting position, and for retarding the movements of said members toward the running position, and appliances controlled by said means for cutting out said auxiliary starting resistance.

7. In motor-controlling apparatus, the combination with an alternating current motor, of starting resistance connected to the rotor thereof, resistance-varying members normally short-circuiting said resistance, auxiliary starting resistance normally in circuit, electromagnetic means operated upon the application of current to the motor to move said resistance-varying members from normal to starting position, and appliances controlled by said means for cutting out said auxiliary resistance, said means also retarding the automatic movements of said members from starting to running position to effect a gradual cutting out of said starting resistance.

8. In motor-controlling apparatus, the combination with an alternating current motor, of starting resistance connected to the rotor thereof, an auxiliary starting resistance, a resistance contact member normally in the running position, said member being movable from the running position to the starting position and automatically from the starting position to the running position, electromagnetic means operated upon the motor receiving current for moving said resistance contact member to starting position and for retarding its movement toward the running position, and appliances operated upon said member reaching starting position for cutting out said auxiliary resistance.

9. In motor-controlling apparatus, the combination with an alternating current motor, of a main starting resistance, an auxiliary starting resistance, a resistance contact member normally in the running position, electromagnetic means operated by alternating current for moving said member from running to starting position, and retarding the movement of said member automatically from starting position to running position, and automatic mechanism for controlling said auxiliary starting resistance.

10. In motor-controlling apparatus, the combination with an alternating current motor, a main starting resistance connected to the rotor thereof, an auxiliary starting resistance connected thereto, one or more resistance contact members normally in the running position and short-circuiting said main starting resistance, electromagnetic means operated by alternating current for moving said members from normal to starting position and for retarding the automatic movements of said members from starting to running position, and mechanism for controlling said auxiliary resistance.

11. In motor-controlling apparatus, the combination with a main starting resistance for an alternating current motor, of an auxiliary starting resistance, one or more switches normally short-circuiting said main resistance, and electromagnetic means operated by alternating current for opening said switches and for automatically permitting the successive closure of said switches to effect a gradual cutting out of said resistance, and mechanism dependent upon the opening of said switches for cutting out said auxiliary resistance.

12. In motor-controlling apparatus, the combination with an alternating current motor, of main starting resistance therefor, auxiliary starting resistance, one or more switches normally short-circuiting said main resistance, one or more single-phase magnets, one for operating each of said switches to initially insert said main resistance and thereafter gradually cut out the same to effect the acceleration of the motor, and mechanism automatically operated upon the opening of all of said switches for cutting out said auxiliary resistance.

13. In motor-controlling apparatus, the combination with an alternating current motor, of a main starting resistance therefor, a resistance-varying member or members normally short-circuiting said resistance when in its initial position, an auxiliary starting resistance, and electromagnetic means for inserting said resistance in circuit with the rotor of the motor upon application of current to the motor, and to automatically permit said member to again short-circuit said starting resistance upon the motor attaining a predetermined speed, and mechanism automatically operated after all the main starting resistance is inserted to cut out said auxiliary resistance.

14. In motor-controlling apparatus, the combination with an alternating current motor, of motor circuits therefor, a main starting resistance connected to a part of the motor, one or more contact members movable in two directions to vary said resistance, an auxiliary starting resistance, electromagnetic means operated upon the motor circuits receiving current to move said resistance-varying member in one direction and to permit the same to move in the opposite direction when the motor attains a predetermined speed, and appliances dependent upon the insertion of all of said main starting resistance for cutting out said auxiliary resistance.

15. In motor-controlling apparatus the combination with an alternating current motor, of starting resistance therefor, one or more accelerating magnet switches for controlling said starting resistance, auxiliary starting resistance, an electromagnetic switch for cutting out said auxiliary resistance, and means operated by one of the accelerating magnets for controlling the auxiliary resistance magnet switches.

16. In motor-controlling apparatus, the combination with an alternating current motor, of starting resistance therefor, electromagnetic accelerating switches for controlling said starting resistance, said starting resistance being normally short-circuited by said switches, a plurality of auxiliary resistances connected in circuit with a part of the motor, a double electromagnetic switch for cutting out said auxiliary resistances, an additional resistance in circuit with the electromagnet of said last-named switch, and an additional switch operated by one of the accelerating magnets to short-circuit said additional resistance to permit the said electromagnetic double switch to cut out said auxiliary resistances.

17. In motor-controlling apparatus, the combination with an electric motor, of starting resistance therefor, accelerating magnet switches normally short-circuiting said resistance, auxiliary resistances normally connected to a part of the motor, and means dependent upon the operation of the accelerating switches for cutting out said auxiliary resistances.

18. In motor-controlling apparatus, the combination with an electric motor, of starting resistance connected to a part of said motor, one or more switches normally short-circuiting said resistance, electromagnets for opening said switches to insert said resistance upon the application of current to the motor, auxiliary resistances normally in circuit with said part of the motor, auxiliary switches for controlling said auxiliary resistances, an electromagnet for operating said auxiliary switches, an additional resistance connected to said last-named electromagnet to prevent its operation when current is first applied to the motor, and an additional switch operated upon the insertion of the starting resistance to short-circuit said additional resistance and permit the second-named electromagnet to operate said auxiliary switches and short-circuit said auxiliary resistances, said first-named electromagnets permitting the switches actuated thereby to gradually short-circuit said starting resistance to effect the acceleration of the motor.

In testimony whereof, I have signed my name to this specification in the presence of two subscribing witnesses.

JOHN D. IHLDER.

Witnesses:
 RUDOLPH C. SMITH,
 J. HALL KINSLEY.